US010730725B2

(12) United States Patent
Ishikawa

(10) Patent No.: US 10,730,725 B2
(45) Date of Patent: Aug. 4, 2020

(54) DISPLAY APPARATUS FOR TRAVELING CRANES AND SYNCHRONIZING APARATUS FOR TRAVELING CRANES

(71) Applicant: TADANO LTD., Kagawa (JP)

(72) Inventor: Iwao Ishikawa, Kagawa (JP)

(73) Assignee: TADANO LTD., Kagawa (JP)

( * ) Notice: Subject to any disclaimer, the term of this patent is extended or adjusted under 35 U.S.C. 154(b) by 267 days.

(21) Appl. No.: 15/561,655

(22) PCT Filed: Mar. 31, 2016

(86) PCT No.: PCT/JP2016/060692
§ 371 (c)(1),
(2) Date: Sep. 26, 2017

(87) PCT Pub. No.: WO2016/159249
PCT Pub. Date: Oct. 6, 2016

(65) Prior Publication Data
US 2018/0072542 A1   Mar. 15, 2018

(30) Foreign Application Priority Data
Mar. 31, 2015 (JP) .................... 2015-072041

(51) Int. Cl.
*B66C 23/90*    (2006.01)
*B66C 13/46*    (2006.01)
(Continued)

(52) U.S. Cl.
CPC .......... *B66C 23/905* (2013.01); *B66C 13/46* (2013.01); *B66C 15/045* (2013.01); *B66C 23/94* (2013.01);
(Continued)

(58) Field of Classification Search
CPC .......... B66C 13/22; B66C 13/46; B66C 23/88
See application file for complete search history.

(56) References Cited

U.S. PATENT DOCUMENTS

2008/0053945 A1* 3/2008 Schneider ............. B66C 15/045
212/276
2013/0013144 A1* 1/2013 Tanizumi ............... B66C 23/905
701/34.4

FOREIGN PATENT DOCUMENTS

CN   201686411 U   12/2010
CN   202558492 U   11/2012
(Continued)

OTHER PUBLICATIONS

Eberharter et al., "Control for Synchronizing Multi-Crane Lifts" (Year: 2010).*

*Primary Examiner* — Navid Ziaeianmehdizadeh
*Assistant Examiner* — Sean P Quinn
(74) *Attorney, Agent, or Firm* — Paratus Law Group, PLLC

(57) ABSTRACT

Provided is a display apparatus fir traveling cranes which is capable of displaying information about another traveling crane. The display apparatus for traveling cranes is equipped with: an imaging unit 20 which is mounted to the vicinity of the tip of a boom; a display unit 30 which displays an image captured by the imaging unit 20; a crane controller 40 which controls the orientation of a traveling crane; a communication unit 53 for mutually transmitting/receiving information to/from the other traveling crane; and an image controller 50 for displaying the information about the other traveling crane, received from the other traveling crane, in such a manner as to superimpose the information upon the image of the display unit.

6 Claims, 3 Drawing Sheets

(51) Int. Cl.
*B66C 15/04* (2006.01)
*B66C 23/94* (2006.01)
*G06T 1/00* (2006.01)
*G06T 11/60* (2006.01)

(52) U.S. Cl.
CPC ............ *G06T 1/0007* (2013.01); *G06T 11/60* (2013.01); *G06T 2207/30252* (2013.01)

(56) References Cited

FOREIGN PATENT DOCUMENTS

| | | |
|---|---|---|
| CN | 102862915 A | 1/2013 |
| JP | 62-060359 B | 12/1987 |

\* cited by examiner

DISPLAY APPARATUS FOR TRAVELING CRANES AND SYNCHRONIZING APARATUS FOR TRAVELING CRANES

CROSS REFERENCE TO PRIOR APPLICATION

This application is a National Stage Patent Application of PCT International Patent Application No. PCT/JP2016/060692 (filed on Mar. 31, 2016) under 35 U.S.C. § 371, which claims priority to Japanese Patent Application No. 2015-072041 (filed on Mar. 31, 2015), which are all hereby incorporated by reference in their entirety.

TECHNICAL FIELD

The present invention relates to a display device of a mobile crane for cooperative lifting of a cargo with a plurality of mobile cranes.

BACKGROUND ART

Conventionally, a so-called cooperative lifting operation of lifting of one cargo with a plurality of cranes is performed. In general, in a cooperative lifting operation, an operator in each crane operates the crane while communicating with each other with a transceiver or the like. However, the operation which is performed while communicating with each other using the voice is inefficient and may cause an accident due to operation errors.

In view of this, for example, PTL 1 discloses an operation control device which achieves a synchronized operation in which the operator in only one of the cranes can control the hook of the other crane to operate along with the hook of the own crane.

CITATION LIST

Patent Literature

PTL 1
Japanese Examined Patent Publication No. 62-60359

SUMMARY OF INVENTION

Technical Problem

However, in a cooperative lifting operation, the positions of the cranes with respect to the lifting cargo are different from each other. As a result, there is a possibility that the lifting cargo of one crane is in the safe operation range, while the lifting cargo of the other crane is not in the safe operation range.

In view of this, an object of the present invention is to provide a display device of a mobile crane which can display information about other mobile cranes.

Solution to Problem

To achieve the above-mentioned object, a display device of a mobile crane of an embodiment of the present invention includes: an imaging section attached in the vicinity of an end of a boom; a display section that displays an image picked up by the imaging section; a crane controller that controls an orientation of the mobile crane; a communication section for exchanging information with another mobile crane; and an image controller for superimposing and displaying on the image of the display section information about the other mobile crane received from the other mobile crane.

Advantageous Effects of Invention

As described above, a display device of a mobile crane of an embodiment of the present invention includes: an imaging section attached in the vicinity of an end of a boom; a display section that displays an image picked up by the imaging section; a crane controller that controls an orientation of the mobile crane; a communication section for exchanging information with another mobile crane; and an image controller for superimposing and displaying on the image of the display section information about the other mobile crane received from the other mobile crane. With this configuration, the information about the other mobile crane can be determined by visually recognizing the image of the display section, and accordingly the safety of a cooperative lifting of a cargo with a plurality of mobile cranes is improved.

DESCRIPTION OF EMBODIMENTS

An embodiment of the present invention is described below with reference to the accompanying drawings. It should be noted that the configurations disclosed in the following embodiment are merely examples, and the present invention is not limited thereto. While rough terrane crane 1 is described in the following embodiment, the present invention is not limited thereto, and can be widely applied to mobile cranes such as all terrane cranes.

Embodiment 1

(General Configuration of Crane)

Figure 1:
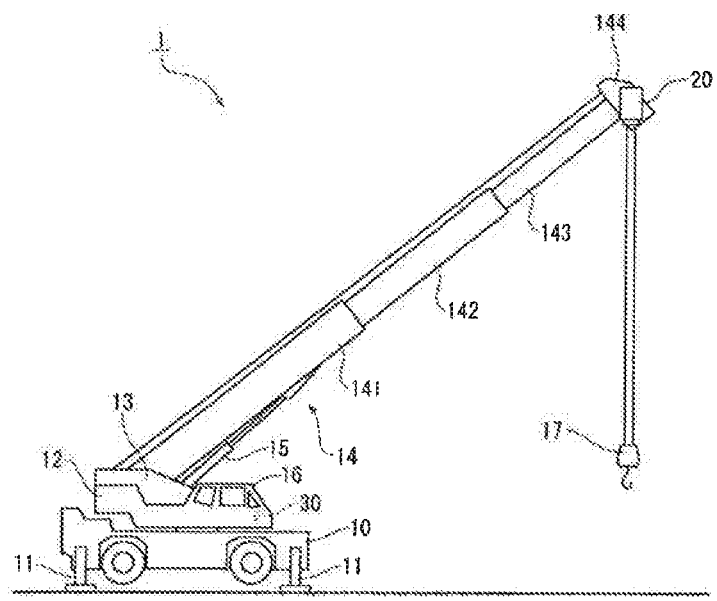
FIG. 1 is a side view illustrating a general configuration of a rough terrane crane.

As illustrated in FIG. 1, rough terrane crane 1 of the present embodiment includes vehicle body 10 that serves as the main body part of a vehicle having a travelling function, outriggers 11 that are provided at the four corners of vehicle body 10, slewing base 12 that is disposed on vehicle body 10 and can be horizontally slewed, and boom 14 that is disposed to bracket 13 that is uprightly disposed on slewing base 12.

Slewing base 12 includes a pinion gear to which the power of a slewing motor is transmitted, and slewing base 12 turns about the slewing axis when the pinion gear engages with a circular gear provided in vehicle body 10. Stewing base 12 includes cabin 16, bracket 13, and a counter weight (not illustrated in the drawing). In cabin 16, display 30 is disposed as a display section that displays a moving image (real time image) picked up with movie camera 20 described later.

Boom 14 is composed of base end boom 141, middle boom 142 and leading end boom 143 which are disposed in a nesting manner (in a telescopic manner). Boom 14 can be extended and contracted with an extendable cylinder (not illustrated in the drawing) disposed inside boom 14. Further, the base of base end boom 141 is tunably attached to a support shaft horizontally installed at bracket 13, and the entirety of boom 14 can be raised and lowered by extending and contracting cylinder 15.

Then, movie camera 20 as an imaging section for picking up the state of a lifting cargo in real time is attached at boom head 144 at the leading end of leading end boom 143. Orientation changing device 21 is attached in movie camera 20, and the orientation thereof can be changed in the tilt direction (vertical direction) and the pan direction (lateral direction) at given angles. The operation of movie camera 20 is performed with an operation section (not illustrated) provided in cabin 16.

(Configuration of Control System)

Figure 2:
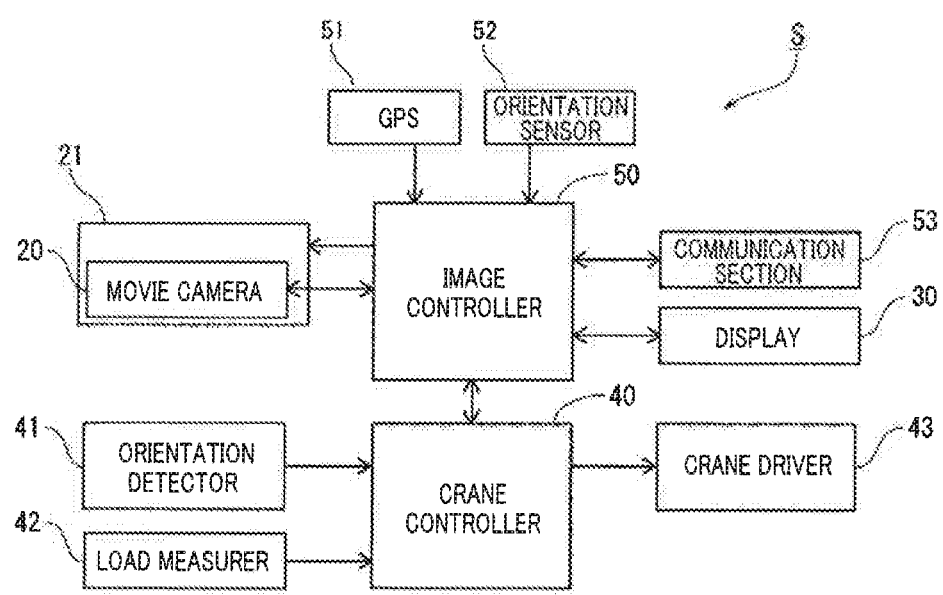
FIG. 2 is a block diagram of a control system of a display device of a mobile crane.
Figure 3:
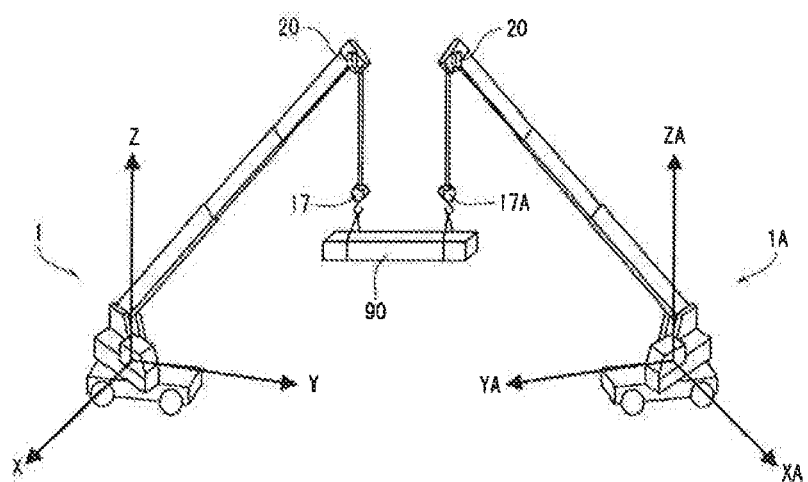
FIG. 3 is a conceptual view of a coordinate system of two rough terrane cranes.

Next, with reference to the block diagram of FIG. 2, a configuration of the control system of rough terrane crane 1 of the present embodiment is described. As illustrated in FIG. 2, display device S of the mobile crane of the present embodiment includes crane orientation detector 41 and load measurer 42 as an input system to crane controller 40, and crane driver 43 as an output system from crane controller 40. Crane orientation detector 41 detects the slewing, raising, lowering, extending, contracting, outrigger projection and the like. Load measurer 42 measures the weight of a lifting cargo. Crane driver 43 is configured for the stewing, raising, lowering, extending, contracting and the like. In addition, display device S of the mobile crane of the present embodiment includes, as an input system to image controller 50, GPS 51, orientation sensor 52, movie camera 20 as an imaging section, wireless or wired communication section 53, and display 30 as a display section. In addition, display device S of the mobile crane of the present embodiment includes, as an output system from image controller 50, orientation changing device 21 of movie camera 20, communication section 53, and display 30. In the present embodiment, crane controller 40 and image controller 50 can communicate with each other.

Crane controller 40 detects the orientation of the crane in response to a signal from orientation detector 41. Crane controller 40 controls the crane in response to an operation signal from an operation lever (not illustrated in the drawing). Further, Crane controller 40 inputs the value of the weight of the lifting cargo detected by load system 42 to crane controller 40.

Image controller 50 superimposes and displays information about another mobile crane received from the other mobile crane on the image of display 30. More specifically, image controller 50 performs a step of computing a movement limitation line of the own machine or/and another machine, a step of computing a picked-up image range, and a step of performing coordinate conversion and drawing a movement limitation line in the image. The following describes the steps in an example case where movement limitation line L1 is superimposed and displayed as information about another mobile crane.

First, the step of computing movement limitation lines of the own machine or/and another machine is described. Image controller 50 computes the maximum operational radius of boom 14 about the slewing center based on the lifting cargo load and the outrigger projection amount acquired by crane controller 40. That is, image controller 50 determines a curve (boundary line) representing the region of the maximum operational radius as movement limitation line L1.

Next, the step of computing an picked-up image range is described. On the basis of the zoom multiplying factor, the tilt angle, the pan angle, and the height position of movie camera 20, image controller 50 determines the coordinate of the range picked up with the slewing center set at the origin. The height of movie camera 20 is computed based on the raising/lowering angle and the length of the boom acquired by crane controller 40.

Figure 4:
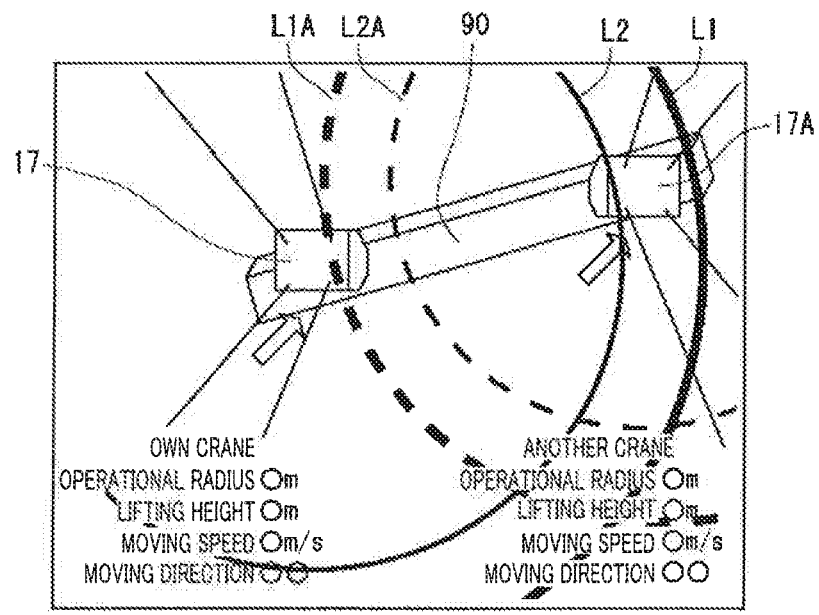
FIG. 4 is an explanatory diagram of a monitor image indicating a performance limitation line and a load rate.
Figure 5:
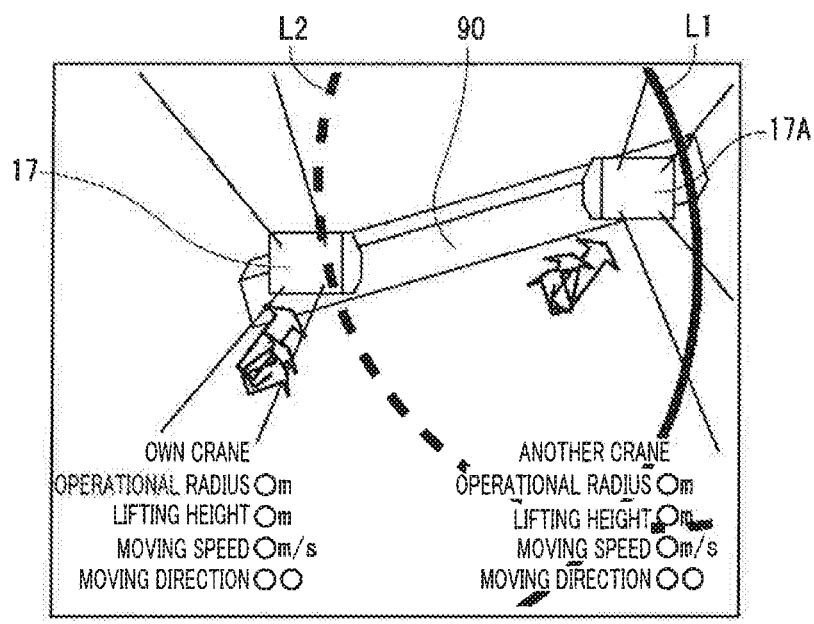
FIG. 5 is an explanatory diagram of a monitor image indicating a moving direction and a moving amount of a lifting cargo.

Next, the step of performing coordinate conversion and drawing movement limitation line L1 in an image is described. As illustrated in FIGS. 4 and 5, image controller 50 superimposes and displays obtained movement limitation line L1 on an image displayed on display 30. Specifically, image controller 50 converts the coordinate (relative coordinate system) of movement limitation line L1 to the absolute coordinate system to which picked-up image G1 belongs, and superimposes and displays on picked-up image G1 movement limitation line L1.

The following information is displayed on an image of display 30 by image controller 50 as information about another mobile crane, for example.

"Movement limitation line": a curve (boundary line) representing the region of the maximum operational radius around the slewing center of boom 14 is referred to as movement limitation line L1. Movement limitation line L1 is a curve obtained by connecting the maximum operational radius computed based on the weight of the lifting cargo acquired by crane controller 40 and the projection amount detected by the outrigger projection sensor. Movement limitation line L1 has a circular shape in the case where the performance does not change throughout the entire perimeter, and may have an undulation depending on the projection amount of the outrigger. In this case, since the orientation of own crane 1 is detected with orientation sensor 52, movement limitation line L1 can be further correctly drawn.

"Load rate line": while movement limitation line L1 is a maximum operational radius with an actual lifting cargo weight, load rate line L2 is a curve representing a ratio (for example 90%) of an actual lifting cargo weight to the maximum lifting load. That is, load rate line L2 of 100% coincides with movement limitation line L1. Load rate line L2 can be computed in substantially the same procedure as movement limitation line L1. A plurality of load rate lines L2, for example, load rate lines L2 of 80% and load rate lines L2 of 90%, can be drawn.

"Operational radius and lifting cargo weight": the lifting cargo weight and the numerical value of the operational radius of the present state can be displayed. In addition, the lifting height, the moving speed of boom head 144, the numerical value of the moving direction and the like can also be displayed.

"Moving direction and moving amount of boom (movement vector)" the moving direction and the moving amount of booms 14 of the own machine and another machine can be displayed. The movement vector is computed in crane controller 40 or image controller 50 based on the operation signal of the operation lever.

"Variation of moving direction and moving amount of boom (movement vector)": this corresponds to variation of the moving direction and the moving amount of booms 14 of the own machine and another machine, and is computed in crane controller 40 or image controller 50. A variation of the movement vector can be expressed by forming an after-image of the movement vector, by displaying a vector obtained by computing the variation amount, or the like.
(Operation)

Next, an operation of display device S of the mobile crane of the present embodiment is described.

i) Generation of Crane Coordinate System

After own crane 1 and other crane 1A are placed, the positions and the bearings (orientations) of the cranes are determined with GPS 51 and orientation sensor 52 disposed in each crane. Further, the three-dimensional coordinate system (XA, YA, ZA) around the stewing c rite f other crane 1A, and the absolute coordinate system (X, Y, Z) around the stewing center of own crane 1 are generated. The three-dimensional coordinate system (XA, YA, ZA) of other crane 1A can be converted to the absolute coordinate system at this point of time. Preferably, own crane 1 and other crane 1A have the same performance, although, the performances of the cranes may be different from each other.

ii) Exchange of Data (Communication)

The movable range data in the entire perimeter with respect to the present lifting cargo weight (which include movement limitation line L1 and load rate line L2), and the present orientation state (operational radius, lifting height, slewing angle, lifting cargo weight and the like) of the cranes are exchanged between the cranes. While wireless communication is adopted herein, wired communication may also be adopted. The movable range data may be received after the computation, or may be computed in image controller 50 of the own machine after receiving the orientation data of the counterpart.

iii) Drawing

As illustrated in FIG. 4, the performance, movement limitation line L1 and load rate line L2 of the own crane, and the performance, movement limitation line L1A and load rate line L2A of counterpart crane 1A acquired through communications are superimposed and drawn on an image of movie camera 20 of own crane 1. Further, the operating direction and the moving amount (operating amount) are displayed with an arrow (vector). With the arrow displayed in this manner, the synchronization can be recognized when the vectors of own crane 1 and other crane 1A coincide with each other. Movement limitation lines L1 and L1A of own crane 1 and other crane 1A are computed with the absolute coordinate system, or converted to the absolute coordinate system after computed with the relative coordinate system. Likewise, the performance, movement limitation line L1 and the like of own crane 1 are displayed in other crane 1A in a manner similar to the above-mentioned manner.

For example, in the case where lifting cargo 90 is moved in the arrow direction in FIG. 4, movement limitation line L1 where the load rate of own crane 1 is large is the movement limitation of the cooperative lifting of the two cranes. When an operation exceeding the range is performed, the operation is automatically stopped while issuing an alarm at the time point when a predetermined load rate (for example 90%) is exceeded.

In addition, as illustrated in FIG. 5, it is possible to display the time variation of the arrow (vector) of the operating direction and the moving amount (operating amount). Here, the after-images of the previous vectors are displayed to express the time variation. By displaying the after-images of the arrow in this manner, the variation of the operations of own crane 1 and other crane 1A can be recognized. For example, in the case where other crane 1A is about to stop a movement, or is about to start a movement, the timing of the stop and/or the start can be easily synchronized.

Further, although not illustrated in the drawings, other crane 1A can be remote-controlled. The remote control is described below. First, in own crane 1, the operating amount and the operating direction of other crane 1A are computed with crane controller 40 or image controller 50 based on the moving amount and the moving direction of own crane 1 such that other crane 1A synchronizes with the moving amount and the moving direction of own crane 1, and the operating amount and the operating direction computed in this manner is transmitted to other crane 1A through communication section 53. In other crane 1A, crane controller 40 outputs an operation signal to crane driver 43 based on the operating amount and the operating direction received through communication section 53 of other crane 1A. That is, as a computing section that computes the operation information for synchronizing own crane 1 with other crane 1A based on the information about other crane 1A received from other crane 1A, crane controller 40 or image controller 50 of own crane 1 or other crane 1A can be used. Further, as an operation section that operates own crane 1 (or other crane 1A) based on the computed operation information, crane controller 40 can be used. Through the above-mentioned steps, a remote control of other crane 1A by own crane 1 can be achieved.

(Effect)

Next, effects of display device S of the mobile crane of the present embodiment are described, (1) Display device S of a mobile crane of the present embodiment includes: movie camera 20 as an imaging section attached in the vicinity of an end of a boom 14; display 30 as a display section that displays an image picked up by movie camera 20; crane controller 40 that controls an orientation of the mobile crane; communication section 53 for exchanging information with another mobile crane; and image controller 50 for superimposing and displaying on the image of display 30 information about other mobile crane 1A received from other mobile crane 1A. With this configuration, the information about other mobile crane 1A can be easily determined by visually recognizing the image of display 30, and accordingly the safety at the time of cooperative lifting of lifting cargo 90 with a plurality of mobile cranes 1 and 1A is improved, (2) Image controller 50 superimposes and displays a movement limitation line of lifting cargo 90 of other mobile crane 1A on the image of display 30 as the information about other mobile crane 1A. With this configuration, movement limitation line L1 of other mobile crane 1A can be easily determined by visually recognizing display 30, and accordingly the cooperative lifting can be performed in a safe range of both mobile cranes 1 and 1A. Additionally, since the allowance of other mobile crane 1A can be determined, the operation efficiency is improved.

(3) Image controller 50 superimposes and displays load rate L2 with respect to a movement limitation of a lifting cargo 90 of other mobile crane 1A on the image as the information about other mobile crane 1A. With this configuration, load rate line L2 of other mobile crane 1A can be easily determined by visually recognizing display 30, and accordingly the operation safety of the cooperative lifting is high. That is, with load rate line L2 in addition to movement limitation line L1, the degree of the safety (the degree of the allowance) inside the movement limitation line L1 can be easily determined. In view of this, even when an operation is performed at a position near movement limitation line L1, the safety can be ensured without excessively reducing the operation speed.

(4) Image controller 50 superimposes and displays an operational radius and a lifting cargo 90 load of other mobile crane 1A on the image as the information about other mobile crane 1A. With this configuration, the state of other mobile crane 1A can be confirmed with specific numerical values by visually recognizing display 30, and accordingly, together with the image that can be intuitively determined, the state of other mobile crane 1A can be further easily determined.

(5) Image controller 50 superimposes and displays a moving direction and a moving amount of an own boom end on the image, and superimposes and displays a moving direction and a moving amount of a boom end of other mobile crane 1A on the image as the information about other mobile crane 1A. With this configuration, the moving direction and the moving amount of the boom end of other mobile crane 1A can be easily determined by visually recognizing display 30, and accordingly the moving direction and the moving amount of mobile crane 1 as the own machine can be easily synchronized.

(6) Image controller 50 superimposes and displays on the image a moving direction and a moving amount of a boom end of other mobile crane 1A while changing the moving direction and the moving amount of the boom end of other mobile crane 1A on a time-series basis. With this configuration, the variation of the moving direction and/or the moving speed can be visually recognized, and accordingly synchronization can be easily established even when the moving direction and/or the moving speed is changed.

(7) Synchronizing device S1 of a mobile crane of the present embodiment includes: display device S of any of the mobile cranes; a computing section that computes operation information for synchronizing other mobile crane 1A with the mobile crane based on orientation information of the mobile crane; and an operation section that operates other mobile crane 1A based on computed operation information. That is, in mobile crane 1 on one side, the operating amount and the operating direction of the other mobile crane 1A is computed and transmitted, and other mobile crane 1A receiving the transmitted operating amount and operating direction controls other mobile crane 1A based on the received operating amount and operating direction. With this configuration, the safety of the cooperative lifting operation can be further increased. That is, with synchronizing device S1 of the mobile crane of the present embodiment, the synchronization operation is performed while displaying the information about other mobile crane 1A, and accordingly it is possible to eliminate the possibility of a synchronization operation in which one mobile crane 1 is in the safe operation range while the other mobile crane 1A is out of the safe operation range.

While the invention made by the present inventor has been specifically described based on the preferred embodiment, it is not intended to limit the present invention to the above-mentioned preferred embodiment but the present invention may be further modified within the scope and spirit of the invention defined by the appended claims.

For example, while crane controller 40 and image controller 50 are separated parts in the embodiment, the present invention is not limited to this, and crane controller 40 and image controller 50 may be physically the same controller.

In addition, while a cooperative lifting operation by two mobile cranes 1 and 1A is described in the embodiment, the present invention is not limited to this. The present invention is also applicable to configurations including three or more mobile cranes.

Further, while both two mobile cranes 1 and 1A include mobile crane display device S of the embodiment of the present invention in the embodiment, the present invention is not limited to this, and mobile crane display device S of the embodiment of the present invention may be provided in only one of the mobile cranes. Preferably, mobile crane display device S is provided in the both cranes.

REFERENCE SIGN FIRST

S Display device of mobile crane
1, 1A Rough terrane crane
14 Boom
144 Boom head
17, 17A Hook block
20 Movie camera (Imaging section)
30 Display (Display section)
40 Crane controller
50 Image controller
51 GPS
52 Orientation sensor
53 Communication section
90 lifting cargo

The invention claimed is:

1. A display device of a mobile crane, the display device comprising:
   a camera attached to a boom head of an end of a boom;
   a display configured to display an image picked up by the camera;
   a communication circuitry configured to exchange information with an other mobile crane; and
   an image control circuitry configured to superimpose and display on the image of the display information about the other mobile crane received from the other mobile crane,
   wherein the image control circuitry is further configured to superimpose and display a moving direction and a moving amount of the end of the boom on the image, and superimpose and display a moving direction and a moving amount of a boom end of the other mobile crane on the image as the information about the other mobile crane.

2. The display device of the mobile crane according to claim 1, wherein the image control circuitry is further configured to superimpose and display a movement limitation line of a lifting cargo of the other mobile crane on the image of the display as the information about the other mobile crane.

3. The display device of the mobile crane according to claim 1, wherein the image control circuitry is further configured to superimpose and display a load rate with respect to a movement limitation of a lifting cargo of the other mobile crane on the image as the information about the other mobile crane.

4. The display device of the mobile crane according to claim 1, wherein the image control circuitry is further configured to superimpose and display an operational radius and a lifting cargo load of the other mobile crane on the image as the information about the other mobile crane.

5. The display device of the mobile crane according to claim 1, wherein the image control circuitry is further configured to superimpose and display on the image the moving direction and the moving amount of the boom end of the other mobile crane while changing the moving direction and the moving amount of the boom end of the other mobile crane on a time-series basis.

6. A synchronizing device of a mobile crane, the synchronizing device comprising:
- the display of the mobile crane according to claim 1;
- a computer configured to compute operation information for synchronizing the other mobile crane with the mobile crane based on orientation information of the mobile crane; and
- an operation circuitry configured to operate the other mobile crane based on the computed operation information.

* * * * *